Oct. 6, 1959  K. TEER  2,907,820
MULTIPLEX TRANSMISSION SYSTEM
Filed July 31, 1953                                           4 Sheets-Sheet 2

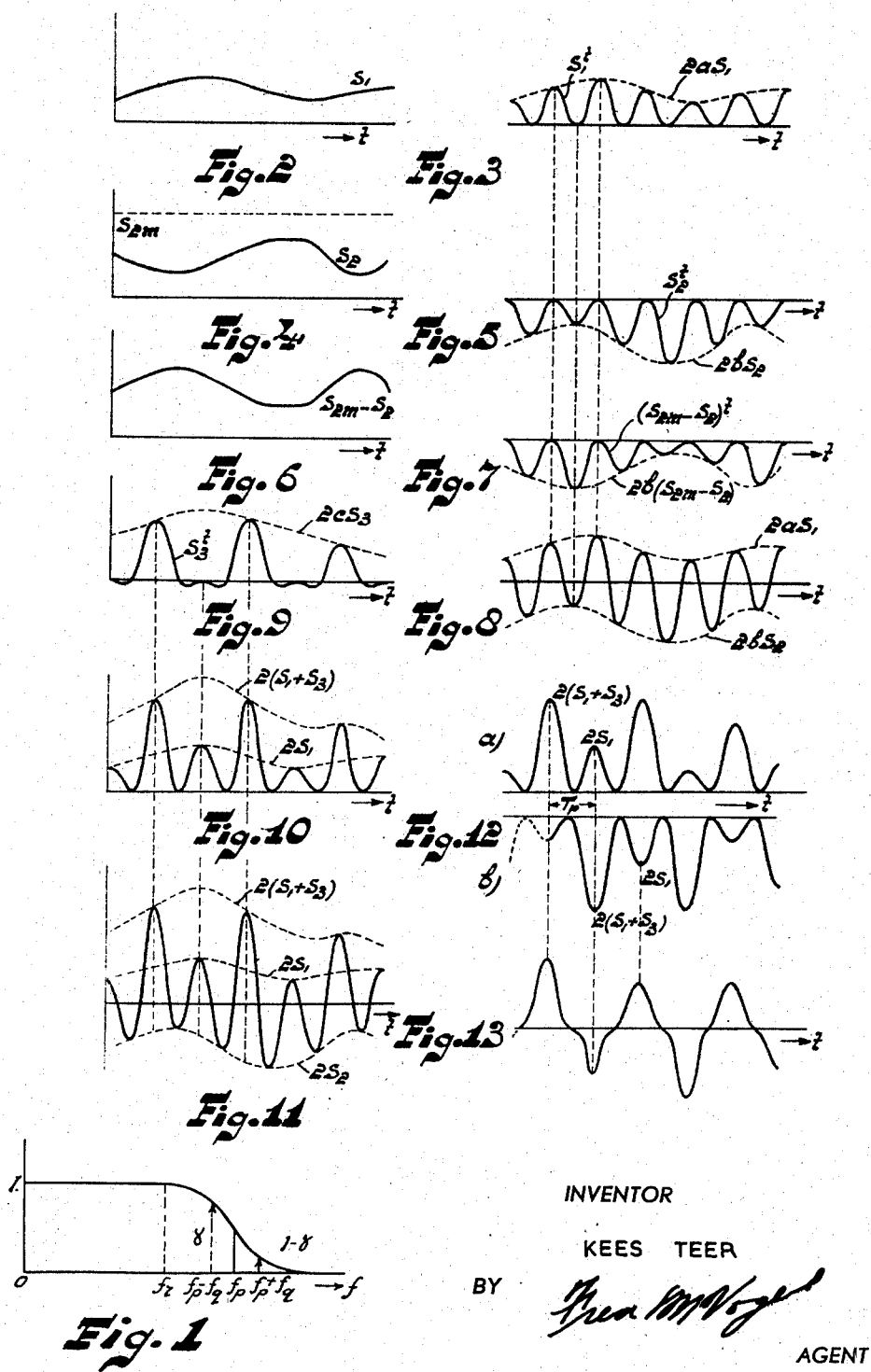
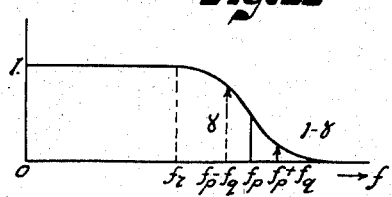

INVENTOR
KEES TEER
BY
AGENT

Oct. 6, 1959 K. TEER 2,907,820
MULTIPLEX TRANSMISSION SYSTEM
Filed July 31, 1953 4 Sheets-Sheet 3

INVENTOR
KEES TEER
BY
AGENT

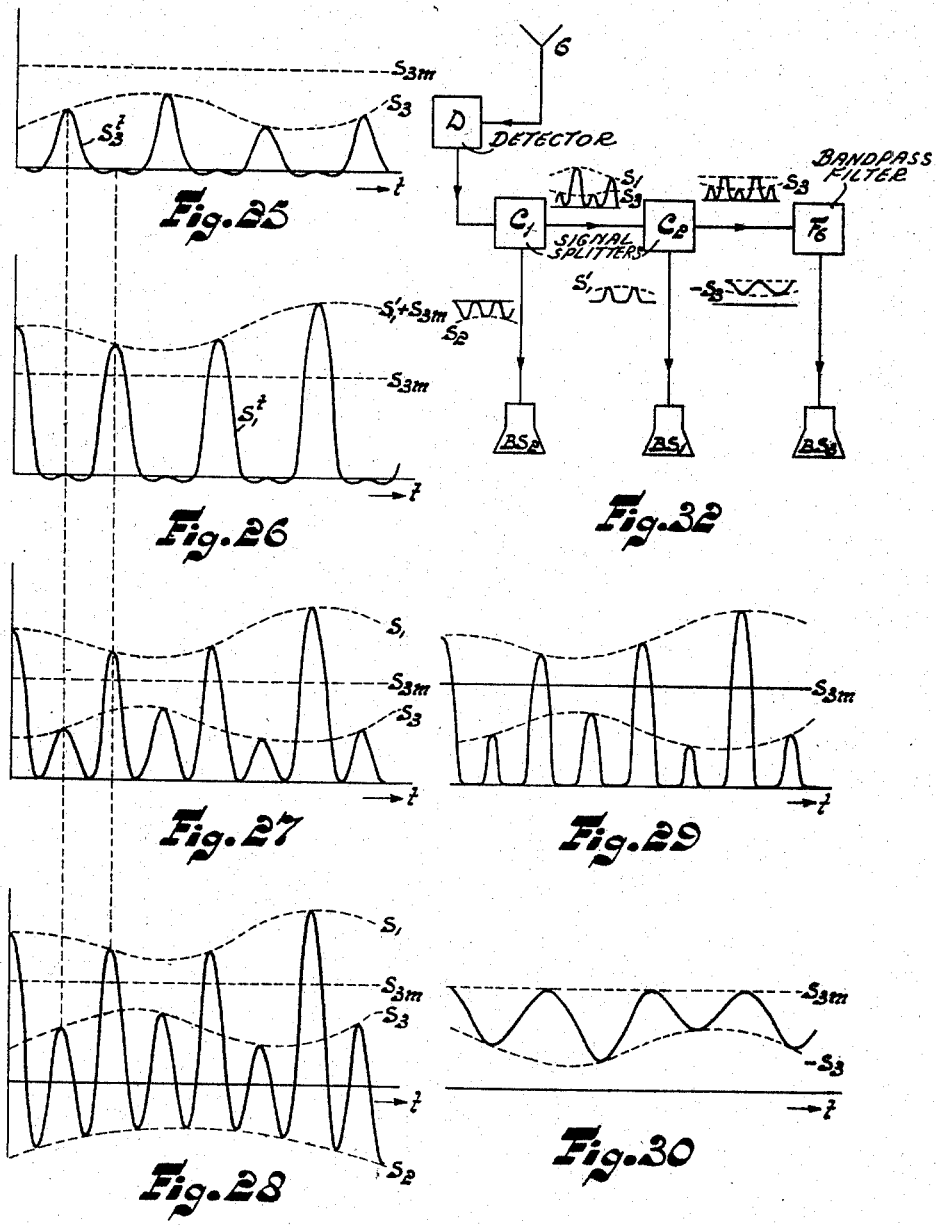

United States Patent Office 2,907,820
Patented Oct. 6, 1959

2,907,820
MULTIPLEX TRANSMISSION SYSTEM

Kees Teer, Eindhoven, Netherlands, assignor, by mesne assignments, to North American Philips Company, Inc., New York, N.Y., a corporation of Delaware Application July 31, 1953, Serial No. 371,695

Claims priority, application Netherlands October 21, 1952

25 Claims. (Cl. 178—6.8)

The invention relates to multiplex signal-transmission systems in which use is made of an auxiliary oscillation, of which the positive-polarity part of the envelope contains information about these signals and the negative-polarity part of the envelope contains other information about these signals, the auxiliary oscillation being split on the receiver side into a part having positive polarity and a part having negative polarity, from which information about the separate signals is derived.

Such systems are known for the transmission of audio-frequency signals and were originally intended to transmit two signals in one frequency range, the separate transmission of each of which requires double the frequency range. It has, however, been found that such a transmission of two signals requires the same bandwidth as the separate transmission of these signals and that on the receiver side only the separation of the two signals is simpler and may be carried out without the need for separating filters.

The invention is based on the recognition of the fact that in the case of signals for television images or other images scanned line-wise the frequency range required for the transmission of the auxiliary oscillation may be materially smaller than the frequency range required for normal transmission of the signals in one frequency band each, if use is made of the fact that owing to the inertia of the eye in catching the reproduction of an image on the receiver side, it is not required to give the full information of a line in one scanning. The invention is characterised in that, in the case of signals for television images or similar images scanned line-wise, each of the signals is dotted by multiplication with a periodical signal, the dot-producing signal maximum frequency to be transmitted of at least one of these signals and the fundamental frequency $f_p$ of the associated dot-producing signal are equal to the limit frequency of the total transmission band.

In order that the invention may be readily carried into effect, it will now be described with reference to the accompanying drawing, which shows embodiments of the system according to the invention.

Fig. 1 shows the transmission characteristic curve of a low pass filter, which symbolizes the combined frequency limitation of the total transmission path, Fig. 2 shows a signal converted into a signal as shown in Fig. 3, Fig. 4 a signal converted into a signal as shown in Fig. 5, Fig. 6 is a signal derived from the signal shown in Fig. 4, this signal producing, subsequently to conversion, a signal as shown in Fig. 7.

Fig. 8 shows a signal produced by combining the signals shown in Figs. 3 and 5.

Fig. 9 shows a signal derived from a third signal to be transmitted,

Fig. 10 the signal produced by combining the signals shown in Figs. 3 and 9,

Fig. 11 the combination of the signals shown in Figs. 5 and 10,

Fig. 12 a signal of the waveform shown in Fig. 10 and a delayed signal having opposite polarity, Fig. 13 the combination of the two signals shown in Fig. 12.

Figs. 14, 15, 16 and 17 show the positions of the maxima of the transmitted dotted signals in the frame of a television receiver.

Figs. 18, 19, 20 and 21 show the positions of the maxima of the transmitted, dotted signals on the frame of a television receiver in a different embodiment of the system according to the invention.

Figure 22:
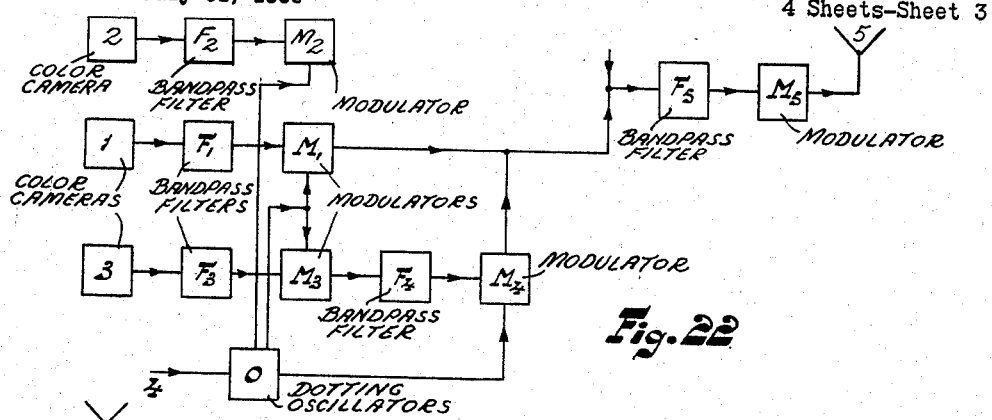

Fig. 22 shows a diagrammatical embodiment of a transmitter for use in a system according to the invention for colour television transmission.

Figure 23:
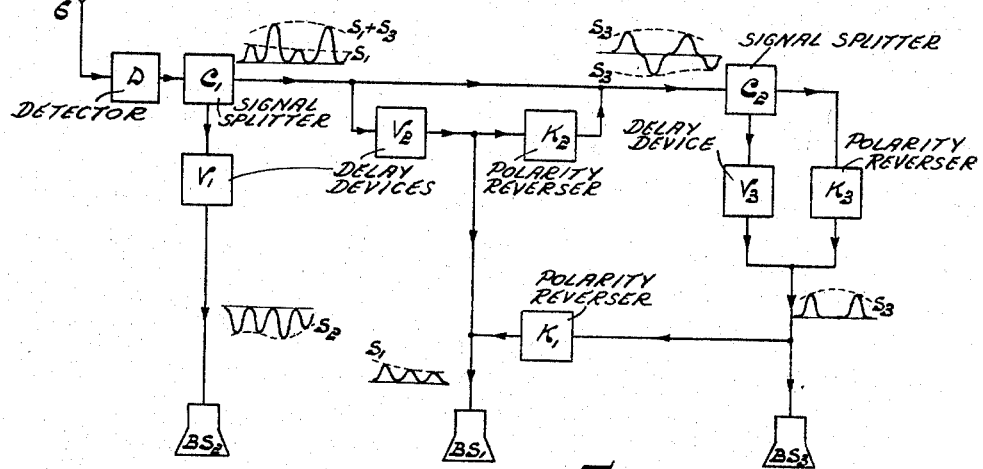

Fig. 23 shows diagrammatically one embodiment of a colour television receiver co-operating with the transmitter shown in Fig. 22.

Figure 24:
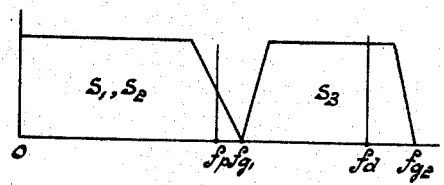

Fig. 24 shows the frequency spectrum of a different embodiment of a multiplex transmission system according to the invention.

Fig. 25 shows the signal of Fig. 9,

Fig. 26 a signal derived from the signal shown in Fig. 2,

Fig. 27 a signal produced by combining the signals shown in Figs. 25 and 26,

Fig. 28 a signal produced by combining the signals shown in Figs. 27 and 5,

Fig. 29 a signal derived, on the receiver side, from the signal shown in Fig. 28.

Fig. 30 a signal derived from the signal shown in Fig. 29.

Figure 31:
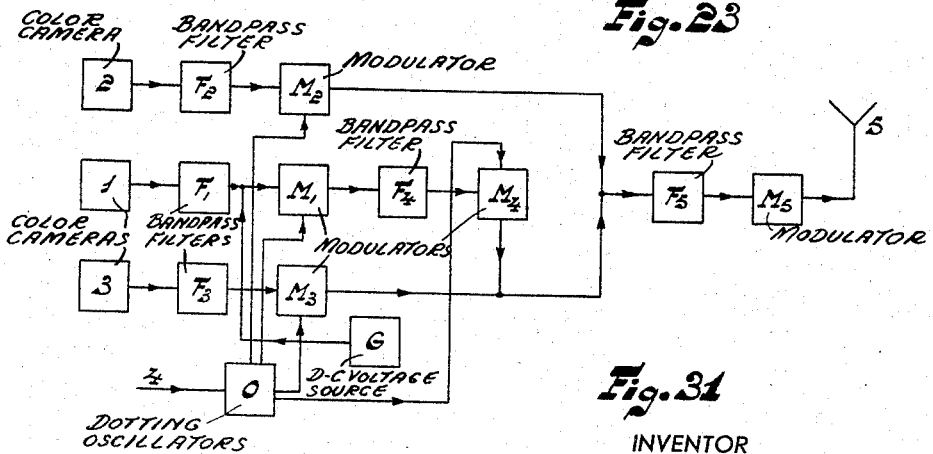

Fig. 31 shows diagrammatically one embodiment of a transmitter for use in a different system according to the invention for colour television transmission.

Fig. 32 shows diagrammatically one embodiment of a colour television receiver co-operating with the transmitter shown in Fig. 31.

Figure 33:
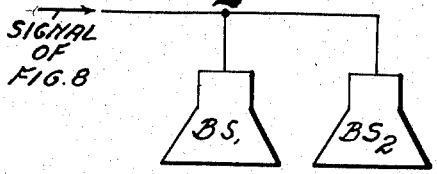

Fig. 33 shows diagrammatically an embodiment of a receiver for receiving the signals shown in Fig. 8.

It will first be assumed that two signals for television images or similar images scanned line-wise $S_1$ and $S_2$ are to be transmitted and that $S_1$ and $S_2$ have a restricted bandwidth to a maximum frequency of $f_p$ and that the maximum amplitudes of $S_1$ and $S_2$ correspond to the maximum brightness of the image. The variations of the signals $S_1$ and $S_2$ as a function of the time $t$ is assumed to be as shown in Fig. 2 and Fig. 4 respectively. For this purpose the signal $S_1$ is dotted by means of the dot-producing signal $P_1 = a \, (1 + 2 \cos \omega_p t + 2 \cos 2\omega_p)$, wherein $\omega_p = 2\pi f_p$. The signal $S_1 P_1$ thus obtained traverses a low pass filter, which symbolizes in this case and in the further cases the combined frequency limitation of the total transmission path and which has a limit frequency $f_p$ and a characteristic of passage as is shown in Fig. 1. From Fig. 1 it is evident that at the frequency $f_p$ the signal amplitude is reduced to half the maximum amplitude value and that the characteristic curve exhibits radial symmetry with respect to $f_p$. For the sake of completeness it is stated that the term "radial symmetry" is to be understood to mean herein that the transmission assumes the value $\gamma$ in the case of a frequency of $f_p - f_q$, this value being $1 - \gamma$ (1 designating the maximum transmission) in the case of a frequency of $f_p + f_q$. The term $2 \cos 2\omega_p t$ in $P_1$ permits of receiving finally with the correct amplitude also frequencies of $S_1$ lying in the range of the low bandpass filter, where the transmission is no longer 1, i.e. in the range of $f_r$ and $f_p$ (Fig. 1). If the low pass filter had an ideal transmission characteristic, this term would not be required in $P_1$. That is, consequently, also the case if an attenuated reproduction of the frequency range concerned suffices.

At the output of the low pass filter there then occurs a dotted signal $S_1^t$ of the waveform shown in Fig. 3. This dotted signal $S_1^t$ is equal to zero at the instants $$t = \frac{(2n+1)\pi}{\omega p}$$

and at the instants $$t = \frac{2n\pi}{\omega p}$$

it is equal to $2aS_1$, wherein $n$ represents a whole number. It is observed that, for the sake of simplicity, Fig. 3 shows the dotted curve corresponding to the signal $S_1$ of Fig. 2 with the same amplitude.

If the signal $S_1$ as a function of time is constant, maxima of $S_1^t$ occur at the last-mentioned instants. If $S_1$, however, is variable $S_1^t$ is still equal to $2aS_1$ at these instants, but the maxima of $S_1^t$ do not occur exactly at these instants. The value zero occurring at the first-mentioned instants is, however, indeed exactly the minimum of the signal $S_1^t$.

The second signal $S_2$, shown in Fig. 4, is dotted by the dot-producing signal $P_2$:

$$P_2 = b\,(-1 + 2\cos \omega_p t - 2\cos 2\omega_p t)$$

The signal $S_2 P_2$ thus obtained traverses again a low pass filter having a characteristic as shown in Fig. 1 and a limit frequency $f_p$. The signal $S_2^t$, shown in Fig. 5, then occurs at the output of this filter.

The signal $S_2^t$ exhibits the value zero at the instants $$t = \frac{2n\pi}{\omega p}$$

and the value $-2bS_2$ at the instant $$t = \frac{(2n+1)\pi}{\omega p}$$

The zero values constitute exact maxima, while the negative peaks constitute exact minima only at a constant signal $S_2$. Hereinafter these slight deviations will no longer be referred to.

From Figs. 3 and 5 it is evident that all of the maxima occur at the same instants and that the minima occur at intermediate instants.

If the signals $S_1^t$ and $S_2^t$ are combined, a signal as shown in Fig. 8 is obtained. The positive part of this signal comprises information about the signal $S_1$, its negative part information about the signal $S_2$.

The signal shown in Fig. 8 is supplied to the transmission path. If this path is a cable of a different conductor, the transmission may be carried out without using a carrier wave. In the case of wireless transmission the signal is modulated on a carrier wave.

After demodulation, if necessary, on the receiver side, the signal shown in Fig. 8 is split into a part having positive polarity and a part having negative polarity. The part having positive polarity is thus equal to $2aS_1$ at the instants $$t = \frac{2n\pi}{\omega p} + T$$

wherein $T$ is the time by which the initially transmitted signal is delayed in the transmission path and may be fed to the control-grid of the associated cathode-ray tube. However, in the case of single scanning of an image line the information, i.e. signal dots having the values $2aS_1$, supplied to the reproducing tube is insufficient to reproduce a signal up to the frequency $f_p$. For this purpose use must be made of dot interlacing. In this case, the maxima of the signals obtained by two successive scannings of the same image line lie in the spaces left between one another. This may, as is known, be obtained in a simple manner by choosing the dotting frequency $f_p$ to be such that it is equal to an odd-numbered multiple of half the frame frequency, however also by providing shifts in the phase of P with a repetition frequency equal to the frame frequency on the transmitter side in a manner such that in two successive scannings of the same line, P exhibits a phase difference $\pi$.

In a similar manner the part having negative polarity supplies, in two successive scannings, the signal $S_2$ by applying this part to the cathode of the reproducing tube associated with $S_2$ or, after reversal of polarity, to the control-grid of the reproducing tube.

It is thus possible to transmit two signals in one channel having a bandwidth which is required, in the case of normal transmission for each of the signals, whilst, moreover, the signals may be separated without the use of separating filters. In order to mitigate the dot structure of the said images, which otherwise is in general, not troublesome, a filtering circuit may be connected before the control-elements of the reproducing tubes, this circuit being tuned to the dotting frequency $f_p$. It is evident from the foregoing that a reference level is to be indicated in the transmitted signal in order to determine the position in the signal of Fig. 8 where the signal is to be split into two signal parts in the receiver; this may, for example, be carried out either by adding a porch to the normal synchronizing signal or by providing a fixed relationship between the position of the reference level and the value of the synchronizing pulses, for example, by means of automatic gain control in the receiver.

If the signals $S_1$ and $S_2$ are such that the maximum amplitudes of $S_1$ and $S_2$ correspond to the minimum brightness of the image, the part having positive polarity may be supplied to the cathode of the reproducing tube associated with $S_1$ and the part having negative polarity to the control-grid of the reproducing tube associated with $S_2$. However, it is advisable not to dot $S_1$ and $S_2$ in this case, but to dot $S_{1m} - S_1$ and $S_{2m}$, wherein $S_{1m}$ and $S_{2m}$ designate the maximum amplitudes of $S_1$ and $S_2$ respectively, the signal derived from $S_{1m} - S_1$ being supplied to the control-grid and the signal derived from $S_{2m} - S_2$ to the cathode of the respective reproducing tubes. If, for example, the signal $S_2$ is such that its maximum amplitude $S_{2m}$ (Fig. 4) corresponds to the minimum brightness of the transmitted image, the signal $S_{2m} - S_2$ (Fig. 6) is derived therefrom, this signal producing, after dotting with $P_2$, a signal $(S_{2m} - S_2)^t$, as is shown in Fig. 7.

It will be obvious that the reproducing tubes themselves may be used to split the signals, by choosing the grid bias voltages of the tubes to be such that, if a signal is supplied to the grid, only the part exceeding a definite level gives rise to an electron beam in the reproducing tube and if a signal is supplied to the cathode, only the part exceeding a definite level in a negative sense gives rise to an electron beam. Such a system is shown in Fig. 33. Consequently, a transmitted signal as is shown, for example, in Fig. 8 may be supplied without preliminary splitting, to two reproducing tubes $BS_1$ and $BS_2$ which provide this splitting by means of a suitable adjustment.

The system so far described, in which two signals $S_1$ and $S_2$ are transmitted after dot interlacing, may, for example, be used for stereo-television and two-colour television.

If it is desired to transmit information about three signals, as is mostly the case with colour television, this may be carried out by transmitting a third signal in an adjacent frequency range. Fig. 24 shows, by way of example, a frequency spectrum occurring in this system. The total frequency range available is assumed to lie between 0 and $f_{g2}$. The combined signal $S_1S_2$, obtained in the manner described above, extends to the frequency $f_{g1}$. A signal $S_3$, modulated on an auxiliary carrier wave $f_d$, may be provided between $f_{g1}$ and $f_{g2}$. On the receiver side the transmitted signal is supplied, on the one hand to a low pass filter having the cutting-off frequency $f_{g1}$, and on the other hand, to a bandpass filter having a passage between $f_{g1}$ and $f_{g2}$. The output signal of the low pass filter is, as described above, split into a part having positive polarity and a part having negative polarity, after which each of these parts is supplied to the respective reproducing tube. The output signal of the bandpass filter may, subsequent to detection, be supplied to a third reproducing tube.

A method of transmitting three signals, which has the advantage over the method described above that at least one of these signals may have a frequency up to the value $f_p$, which is slightly lower than $f_{g2}$, instead of a frequency up to $f_p$, which is slightly lower than $f_{g1}$, as is the case, for example, in Fig. 24, consists in that a signal $S_3^t$ derived from the signal $S_3$ is superposed on the signal $S_1^t$. This signal $S_3^t$ is obtained by dot interlacing of $S_3$ by means of the dot-producing signal $P_3$:

$$P_3 = c(\tfrac{1}{2} + \cos \tfrac{1}{2}\omega_p t + \cos \omega_p t + \cos 3/2\omega_p t)$$

after which the signal $S_3 P_3$ is passed through a filter of the kind shown in Fig. 1. The term $\cos 3/2\omega_p t$ plays a part corresponding with that of the term $2 \cos 2\omega_p t$ in $P_1$ and may therefore also be omitted, if the requirements for the highest frequencies of $S_3$ are less severe.

The signal $S_3^t$ is zero at instants when $S_1^t$ is zero and, moreover, at half of the periods when $S_1^t$ is $2aS_1$. At the other half periods, when $S_1^t$ is $2aS_1$, $S_3^t$ is $2cS_3$. These points are the exact maxima again only at a constant signal $S_3$. These properties of the signal $S_3^t$ only occur, if the signal $S_3$ does not contain frequencies of more than $\tfrac{1}{2} f_p$. The signal $S_3^t$ is shown in Fig. 9, the broken curve indicating the signal $S_3$, the amplitude ratio $2c$ being omitted for the sake of clearness. As is evident from Fig. 9, the signal $S_3^t$ between two maxima does not assume only the value zero, but also negative values, although the amplitude in the negative sense is very low. It is possible, it is true, to suppress these negative signals, so that the signal assumes the value zero for a longer time, but this implies higher harmonics, which are again suppressed in the transmission path.

The signals $S_1^t$ and $S_3^t$ are now combined to form the signal shown in Fig. 10 and the result thus obtained is combined with the signal $S_2^t$, which produces the signal shown in Fig. 11; for the sake of simplicity the constants $a$, $b$ and $c$ are here and hereinafter chosen to be equal to 1.

It should be noted that the same result is, of course, obtained by passing the three dotted signals through a common filter, at the output of which occurs the signal shown in Fig. 11.

The signal shown in Fig. 11, subsequent to modulation, if necessary, on a carrier wave, is then transmitted and, if necessary, subsequent to demodulation, in the receiver, it is reproduced.

It should be noted that the negative parts of the signal $S_3^t$ (Fig. 9) do not affect the maxima of the signal shown in Fig. 10; however, the minima of the signal shown in Fig. 12 are slightly affected, and these minima have the envelope formed by the signal $S_2$. The extent of cross-talk owing to this interference in the reception is found to be very small, whilst moreover on the transmitter side compensation may be obtained by adding a small portion of the signal $S_3$ to the signal $S_2$.

In the receiver the signal shown in Fig. 11 is split into a positive-going signal, which contains information about $S_1$ and $S_3$ and a negative-going signal having information about the signal $S_2$. This negative-going signal may be supplied directly to the cathode or the control-grid of the respective reproducing tube, according as the maxima amplitude of $S_2$ relates to the maximum of the minimum image brightness.

The separation of the information about the signals $S_1$ and $S_3$ from the positive-going signal may, for example, be carried out as follows. The positive-going signal shown in Fig. 12a is delayed, for example, with the aid of a time-delay line for a time $T_p = 2\pi/\omega_p$; then the polarity is reversed, the signal shown in Fig. 12b being thus produced. The signals shown in Figs. 12a and 12b are then combined, which produces the signal shown in Fig. 13.

An examination of the signal shown in Fig. 12a proves that the first maximum on the left-hand side contains information about $S_1 + S_3$ and the second maximum information only about $S_1$; in the meantime, however, $S_1$ will have varied as a function of time.

The first minimum on the left-hand side of Fig. 12b contains information about $S_1 + S_3$; this is combined with the value of the second maximum $S_1$ of Fig. 12a. The value of the first minimum of the signal shown in Fig. 13 will be determined by the signal $S_3$ substantially only if the signal $S_1$ varies only little in a time $T_p$, the time lag, consequently if the signal $S_1$ has a sufficiently restricted bandwidth. A possibility of reducing unwanted interference due to excessively rapid variations of the signal $S_1$ consists, for example, in that the positive-going signal part shown in Fig. 13 is delayed for a time $T_p$ and is combined with the negative-signal part shown in Fig. 13. The interference then consists only of the differentiation between the differences of the successive pulses of $S_1^t$. However, then the information about the signal $S_3$ is reproduced with a time lag $T_p$, so that this time lag must also be introduced with the signals $S_1$ and $S_2$.

If the aforesaid possibility is not used, the positive-going part of the signal shown in Fig. 13 may be separated out and supplied to the associated reproducing tube for reproducing the signal $S_3$.

The positive part of the signal shown in Fig. 13, thus obtained, or the combination of the positive and the negative parts, described above, the time lag being taken into consideration, is combined with negative polarity with the signal shown in Fig. 12a from which the signal containing information about $S_1$ is obtained and may be supplied to the associated reproducing tube.

It will, furthermore, be obvious that the combined measures for obtaining information about the signals $S_1$, $S_2$ and $S_3$ are not subjected to the aforesaid order. Reversal of the polarity of a signal and subsequent delay may, for example, be replaced without any objection by delay of the signal and subsequent reversal of polarity.

Thus the required delayed parts may be obtained from the composed signal not only in the order of splitting-delaying but also in the order of delaying-splitting.

As is evident from the foregoing and from Figs. 9 and 10, the pulses of the signal $S_3^t$ must coincide with pulses of $S_1^t$; otherwise the choice of the position relationship between the pulse series of position- and time-successive lines of the television image is free. This position relationship will, preferably, be chosen to be such that the dot structure of the frequency $\tfrac{1}{2} f_p$, which the signal $S_3^t$ produces, as is evident from Fig. 9, is as little visible as possible, which is particularly of importance with the reception of the compound signal in a normal black-white television receiver.

Figure 14:
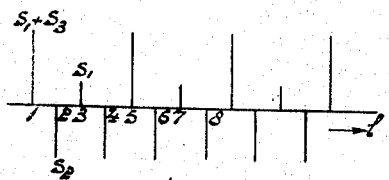
Figure 18:
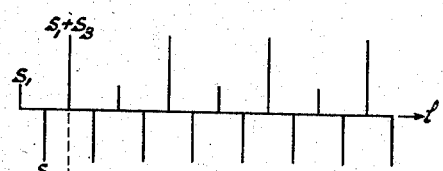
Figure 15:
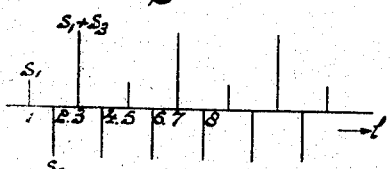
Figure 19:
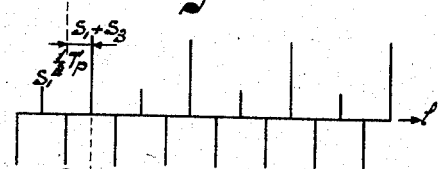

A preferred position relationship will be explained with reference to Figs. 14 and 15. Fig 14 shows the first line of the first field of the frame and Fig. 15 shows the first line of the second field of this frame, so that the lines shown in Figs. 14 and 15 lie immediately one under the other in a total image. By means of vertical lines, each of these lines is provided with a marking of the positions where the signals $S_1$, $S_2$ and $S_3$ occur. It should be noted that these signals are reproduced in, for example, three different reproducing tubes, after which the images obtained are joined optically. As an alternative, use may be made of a tube having three guns, the three signals being reproduced at three different spots each in one dot element.

As is evident from Fig. 14, the signal $S_3$ coincides with the first, fifth, etc. image point and in the second line of the total frame shown in Fig. 15 the signal $S_3$ coincides with the third, seventh, etc. image point, so that with this signal a less interfering dot structure occurs since the image dots are distributed more regularly in the image.

The above explanation applies to the dot structure of two successive lines of the total image. However, it is also of importance to pay attention to the dot structure of the same line, as it is repeated after each total frame period. The position relationship chosen has a great influence on the definition obtainable for the signal $S_3$. If dot interlacing is used, this position relationship is already determined to an extent such that the pulse series of $S_1^t$ are interlaced in two successive total frames, which is also the case with the signal $S_2^t$.

Figure 16:
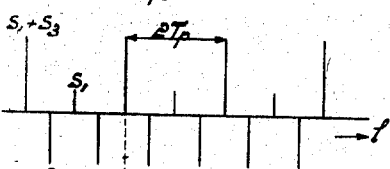
Figure 20:
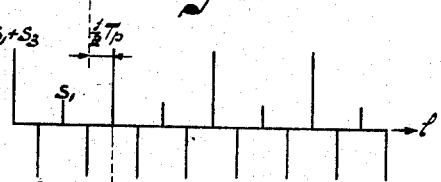
Figure 17:
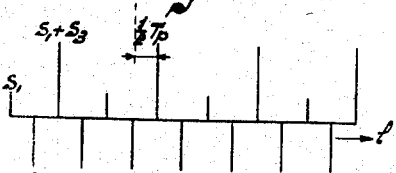
Figure 21:
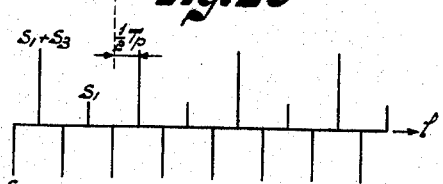

This is shown in Figs. 16 and 17. Fig. 16 shows the condition in a definite line of the frame and Fig. 17 shows the condition on the same line in the next-following total frame.

From these figures it is evident that the positions of the pulses of the signal $S_3$ are spaced apart by a distance corresponding to the quarter of the periods of these pulses $2T_p$ with $T_p = 1/f_p = 2\pi/\omega_p$. If again the same line would be considered in the third total frame, one of the possibilities is that the condition is again the same as that shown in Fig. 16.

However, it is found to be more favourable, if the positions at which the signal $S_3$ occurs are spaced apart each time by a distance corresponding to a time $\frac{1}{2}T_p$, if the same line is considered in four successive total frames. This is shown in Figs. 18, 19, 20 and 21.

From the fact that per line in four successive frames the times of occurrence of the pulses $S_{3p}$ differ by $\frac{1}{2}T_p$, it follows that in four successive frames sufficient information is available to permit a reproduction of $S_3$ up to the maximum frequency $f_p$.

If $P_3$ is modulated, which modulation must be restricted, as stated above, to $\frac{1}{2}f_p$, without using further means by the signal $S_3$, restricted to a bandwidth of $\frac{1}{2}f_p$, the possibilities of the system are not completely utilized.

This will, however, be the case if on the transmitter side the dot-producing signal $P_3$ is modulated by a signal, having it is true a bandwidth $\frac{1}{2}f_p$ but having a further property in that during each frame period at the instants of the pulses of $P_3$ the initial values of the signal $S_3$, having a frequency up to $f_p$, are available. This may be obtained by dotting the signal $S_3$ by means of the signal $P^1 = 1 + 2 \cos \omega_p t$ and subsequent frequency limitation to $\frac{1}{2}f_p$. The resultant signal has the correct value of $S_3$ at a number of instants spaced apart by an interval $T_p$. Dotting of this resultant signal by means of the dot-producing signal $$P_3 = c(\tfrac{1}{2} + \cos \tfrac{1}{2}\omega_p t + \cos \omega_p t + \cos 3/2 \omega_p t)$$

and subsequent limitation of the bandwidth to $f_p$ with the use of a filter as is shown in Fig. 1 yield a signal $S_3^t$, the pulses of which arranged in a definite line in four successive scannings in the manner shown in Figs. 18, 19, 20 and 21, produce a reproduction of the signal $S_3$ up to a frequency $f_p$. This arrangement may be obtained, if $f_p$ is chosen to be equal to an odd-numbered multiple of half the frame frequency, by shifting $P_3$ after each frame comprising two fields, over a distance corresponding to $T_p$, and hence over half a period of the fundamental frequency of $P_3$.

It should be noted that, since now the dotting signal $P_1 = a(1 + 2 \cos \omega_p t + 2 \cos 2\omega_p t)$ is already available, this signal $P_1$ may be used without any objections as the signal $P^1$, since the term $2 \cos 2\omega_p t$ cannot affect the result, owing to the frequency limitation to $\frac{1}{2}f_p$.

Fig. 22 shows in a block-diagram one embodiment of a transmitter for use in the multiplex transmission system for transmitting three colour television signals.

In this figure the devices 1, 2 and 3 represent each a television camera, each of which produces a color signal. These signals are supplied to the respective low bandpass filters $F_1$, $F_2$ and $F_3$. The filters $F_2$ and $F_3$ have the limit frequency $f_p$ and furnish the output signals $S_2$ and $S_3$ respectively, whilst the filter $F_1$ has a limit frequency $af_p$, $a$ being smaller than 1 and containing the signal $S_1$. The output signals of the filters are supplied to the modulators $M_1$, $M_2$ and $M_3$ respectively.

The dot-producing signal $P_1$ is supplied to the modulator $M_1$ and to the modulator $M_3$, and the dot-producing signal $P_2$ is supplied to the modulator $M_2$. These dotting signals are derived from the device O, which comprises one or more suitable oscillators.

Since the frequency $f_p$ must be equal to an odd-numbered multiple of half the frame frequency or else since the phase of $P_1$ and $P_2$ must shift at the beginning of each frame period, the device O is controlled by means of the synchronizing pulses entering at 4.

The output signal of the modulator $M_3$ is supplied via a low bandpass filter $F_4$, having a limit frequency $\frac{1}{2}f_p$, to the modulator $M_4$, to which is also supplied a dotting signal $P_3$, which is also derived from the device O.

The output signals of the three modulators $M_1$, $M_2$ and $M_4$ are combined and supplied to a low bandpass filter having a limit frequency $f_p$ and a characteristic as shown in Fig. 1.

The signal thus obtained is modulated in the modulator stage $M_5$ on a high-frequency carrier wave and fed to the transmitter aerial 5.

Fig. 23 shows in a block-diagram one embodiment of a receiver for use in the multiplex transmission system according to the invention, this receiver being suitable for the reception of signals emitted by the transmitter shown in Fig. 22.

The high-frequency modulated signal is fed via the receiver aerial 6 to the input stage D, which also comprises a detector. The output signal of the stage D is fed to a device $C_1$, which splits this output signal into a positive-going part and a negative-going part, one of which contains information about one of the signals, in the example shown the negative-going part with information about the signal $S_2$, and the other part containing information about the two other signals, in this case the positive-going part with information about $S_1$ and $S_3$.

The part containing information about $S_2$ is supplied via a device $V_1$, which delays the signal for a time $T_p$, to the reproducing tube $BS_2$. The part containing information about $S_1$ and $S_3$ is passed through two channels, one of which comprises a device $V_2$, delaying the signal for a time $T_p$ and a device $K_2$, reversing the polarity of the delayed signal.

The output voltages of the two channels are combined and supplied to a device $C_2$, which splits this combined signal into a positive-going part and a negative-going part. The positive-going part is supplied to a device $V_3$, which delays this part for a time $T_p$; the negative-going part is fed to a device $K_3$, which reverses the polarity of this part.

The output signals of the devices $K_3$ and $V_3$ are combined and supplied on the one hand to the reproducing tube $BS_3$ and on the other hand to a reversing device $K_1$. The output signal of the device $K_1$ is finally combined with the output signal of the device $V_2$, delayed for a time $T_p$ and supplied, subsequent to this combination, to the reproducing tube $BS_1$. Finally the images of the tubes $BS_1$, $BS_2$ and $BS_3$ must be combined optically.

A further method according to the invention to transmit three signals consists in that not only $S_3$ but also $S_1$ is dotted in the manner described above, however, such that $S_1$ is dotted by means of a signal $P_3$, which is shifted for half a period of the fundamental frequency, i.e. $\frac{1}{2}f_p$, relative to the signal $P_3$ dotting $S_3$ and in that $S_1$ is not the color signal itself, as in the former case, but is composed of this color signal $S_1'$ and a direct current component, the value of which is at least equal to the maximum amplitude of $S_3$:$S_{3m}$ so that $S_1=S_1'+S_{3m}$.

Each of the signals thus dotted is passed through a filter having a limit frequency $f_p$ and a characteristic as shown in Fig. 1.

Fig. 25 again shows the signal $S_3{}^t$, derived from $S_3$ and Fig. 26 shows the signal $S_1{}^t$, derived from $S_1$. The signal $S_1{}^t$ is zero at instants when $S_3{}^t$ is equal to $2S_3$; otherwise $S_3{}^t$ is zero at instants when $S_1{}^t$ is $2S1$. Moreover, both $S_1{}^t$ and $S_3{}^t$ are zero at those instants when the signal $S_2{}^t$, obtained in the same manner as described above, is equal to $-2S_2$.

The signals $S_1{}^t$ and $S_3{}^t$ are combined to form the signal shown in Fig. 27 and the resultant signal is combined with the signal $S_2{}^t$, which yields the signal shown in Fig. 28. The same result is obtained by passing the three dotted signals through a common filter.

The signal shown in Fig. 28 is transmitted, subsequent to modulation on a carrier wave, if necessary, and reproduced in the receiver, after demodulation, if necessary.

In the receiver the signal shown in Fig. 28 is split into a positive-going signal, which contains information about $S_1$, i.e. about $S'_1$ and $S_3$ and into a negative-going signal which contains information about the signal $S_2$. This negative-going signal may be supplied directly to the cathode or the control-grid of the same reproducing tube, according as the maximum amplitude of $S_2$ relates to the maximum or the minimum image brightness.

Separating out of the information about the signals $S'_1$ and $S_3$ from the positive-going signal may be carried out as follows. The signal having positive polarity, shown in Fig. 29, is separated at the level $S_{3m}$ into two parts, of which the upper part has, as an envelope, the signal $S'_1$ and the lower part as an envelope of the variable pulses $S_3$.

The upper part may again be supplied without the need for further means to the respective reproducing tube.

The lower part is passed through a filter having a characteristic as shown in Fig. 1, but having a limit frequency $\tfrac{1}{2}f_p$. The output signal of this filter, shown in Fig. 30, is substantially the signal $S_{3m}-S_3$, dotted by a dotting signal $-1+2 \cos \tfrac{1}{2}\omega_p t-2 \cos \omega_p t$. Consequently, if the signal $S_3$ is chosen to be such that the maximum amplitude of $S_3$ corresponds to the minimum image brightness, the signal shown in Fig. 30 may be supplied without further means to the cathode of the respective reproducing tube.

If $S'_1$ is pre-dotted by the dot-producing signal $P^1$ and if, on the transmitter side provision is made of the position relationship of the maxima of the various signals supplied to the reproducing tube by taking the same measures as in the method described above, which is shown in Figs. 18, 19, 20 and 21, two of the signals from the camera tubes are reproduced up to a frequency $f_p$ and the third to a frequency $\tfrac{1}{2}f_p$.

Without this pre-dotting of $S'_1$, only $S_2$ is reproduced up to a frequency $f_p$, the two other signals only to a frequency $\tfrac{1}{2}f_p$, which, however, does not form an objection for various purposes.

Fig. 31 shows in a block diagram one embodiment of a transmitter for use in the multiplex transmission system for the transmission of three colour television signals by the last-mentioned method.

The devices 1, 2 and 3 represent each one television camera, each of which produces a colour signal. These signals are supplied to the low bandpass filters $F_1$, $F_2$ and $F_3$ respectively. The filters $F_1$ and $F_2$ have a limit frequency $f_p$ and produce the output signals $S_1$ and $S_2$, whilst the filter $F_3$ has a limit frequency $\tfrac{1}{2}f_p$.

To the signal derived from $F_1$ is added a direct current component, which is at least equal to $S_{3m}$ and is supplied by the source of direct current G.

The output signals of the filters $S_1$, $S_2$ and $S_3$ respectively are supplied to the modulators $M_1$, $M_2$ and $M_3$.

The dot-producing signal $P_1$ is supplied to the modulator $M_1$; to the modulator $M_2$ is supplied the dotting signal $P_2$ and to the modulator $M_3$ the dot-producing signal $P_3$. These dotting signals are derived from the device O, which comprises the oscillators suitable for this purpose. For the same reason as with the transmitter shown in Fig. 22, the control is also effected by means of the synchronizing pulses entering at 4.

The output signal of the modulator $M_1$ is fed via the low bandpass filter $F_4$ to the modulator $M_4$, to which is also supplied a dot-producing signal $P_3$, however, in a manner such that the dot-producing signal supplied to $M_4$ has a phase difference of half a period relative to the dot-producing signal supplied to $M_3$.

The output signals of the three modulators $M_4$, $M_2$ and $M_3$ are combined and supplied to a low bandpass filter having a limit frequency $f_p$ and a characteristic as shown in Fig. 1.

The signal thus obtained is modulated on a modulator stage $M_5$ on a high-frequency carrier wave and fed to the transmitter aerial 5.

Fig. 32 shows in a block diagram one embodiment of a receiver for use in the multiplex transmission system according to the invention, suitable for the reception of signals emitted by the transmitter shown in Fig. 31.

The high-frequency signal is fed via the receiving aerial 6 to the input stage D, which also comprises a detector. The output signal of the stage D is fed to a device $C_1$, which splits this signal into a part having positive polarity and a part having negative polarity.

The negative-going part, which contains in the example shown information about $S_2$, may be supplied without the need for further means to the relative reproducing tube $BS_2$.

The positive-going part is supplied to a device $C_2$, which splits the signal into an upper part having information about $S_1$ and a lower part having information about $S_3$, in the sense described with reference to Fig. 29.

The upper part may be supplied without further means to the reproducing tube BS.

The lower part is supplied to the reproducing tube $BS_3$ via a low bandpass filter $F_6$, having a characteristic as shown in Fig. 1 and a limit frequency $\tfrac{1}{2}f_p$.

Since in the aforesaid system two separations are carried out in the transmitted signal, provision must be made of two referential levels in this signal or of a fixed relationship between these referential levels and the values of the synchronizing pulses.

It has so far been assumed that the negative-going part of the transmitted signal contains information about one of the signals and the positive-going par information about two signals. It will be obvious that also the negative-going part may contain information about two signals.

The compound signals described above may also produce an image in a normal black-white receiver, since no variations are required for bandwidth, line frequency and frame frequency. By a suitable choice of the ratio between the values of the signals $S_1$, $S_2$ and $S_3$, it may be ensured that the image obtained with respect to the reproduction of a normal black-white signal of the same amplitude in the receiver exhibits only a lower contrast and, moreover, a dotted structure.

What is claimed is:

1. A multiplex transmission system comprising a transmission path having a limited bandwith, first and second sources of image signals representing line-scanned images, first and second sources of dot-producing signals associated respectively with said image signals, the maximum frequency to be transmitted of at least one of the image signals and the frequency of the associated dot-producing signal being equal to the limit frequency of said transmission path, first and second modulator means connected respectively to said first image and dot-producing signal sources and to said second image and dot-producing signal sources to produce first and second dotted image signals, means for combining said dotted image signals to produce a modulated signal of which the positive-polarity part of the envelope represents one of said image signals and the negative-polarity part of the envelope represents the other of said image signals, and receiver means connected to receive said modulated signal and comprising a signal splitter device for splitting said modulated signal into a positive-polarity part and a negative-polarity part.

2. A multiplex transmission system as claimed in claim 1, in which said first dot-producing signal is defined by a mathematical expression in which the first two terms are $a+2a \cos \omega_p t$ and said second dot-producing signal is defined by a mathematical expression in which the first two terms are $-b+2b \cos \omega_p t$, wherein $a$ and $b$ are constants, $\omega_p$ is equal to $2\pi$ times the limit frequency of said transmission path, and $t$ is the time.

3. A multiplex transmission system as claimed in claim 1, including a third source of image signals and a third source of a dot-producing signal, a third modulator connected to said third sources to produce a third dotted image signal, means for combining said third dotted image signal with the combined first and second dotted image signals whereby one of said polarity parts of said envelope represents said third image signals in addition to one of said first and second image signals, and in which said receiver means includes means connected to said signal splitter device to separate said third image signals from said one of said first and second image signals.

4. A multiplex transmission system as claimed in claim 3, in which one of said dot-producing signals is defined by a mathematical expression in which the first two terms are $\pm(a+2a \cos \omega_p t)$, another of said dot-producing signals is defined by a mathematical expression in which the first two terms are $\pm(-b+2b \cos \omega_p t)$ and the remaining of said dot-producing signals is defined by a mathematical expression in which the first three terms are $\pm(\frac{1}{2}c+c \cos \frac{1}{2}\omega_p t+c \cos \omega_p t)$, in which $a$, $b$ and $c$ are constants, $\omega_p$ is equal to $2\pi$ times the limit frequency $f_p$ of said transmission path, and $t$ is the time, and in which said receiver means includes a first delay device connected to said signal splitter device to receive said third image signals and one of said first and second image signals and having a delay time $T_p = 1/f_p$, a polarity reverser connected to receive signals from said first delay device, signal combining means connected to the outputs of said signal splitter device and said polarity reverser to produce a combined signal, a second signal splitter connected to receive said combined signal and separate said combined signal into two signal polarity parts, a second delay device and a second polarity reverser respectively connected to receive said two signal parts, the outputs of said second delay device and said second polarity reverser being connected together, and a third polarity reverser connected between said last-named connection and the output of said first delay device.

5. A multiplex transmission system as claimed in claim 3, in which one of said dot-producing signals is defined by a mathematical expression in which the first two terms are $\pm(a+2a \cos \omega_p t)$, another of said dot-producing signals is defined by a mathematical expression in which the first two terms are $\pm(-b+2b \cos \omega_p t)$ and the remaining of said dot-producing signals is defined by the mathematical expression $\pm(c+2c \cos \omega_p t)$, means for limiting the bandwidth of the dotted signal produced from said remaining dot-producing signal to a frequency of $\frac{1}{2}f_p$, a fourth source of dot-producing signals which are defined by a mathematical expression in which the first three terms are $$\pm(\frac{1}{2}d+d \cos (\frac{1}{2}\omega_p t+n\pi)+d \cos \omega_p t)$$

in which $a$, $b$, $c$ and $d$ are constants, $n$ represents a whole number which varies with unity after $k$ frame periods, $k$ being equal to 1 or 2, $\omega_p$ is equal to $2\pi$ times the limit frequency $f_p$ of said transmission path, and $t$ is the time, and in which said receiver means includes a first delay device connected to said signal splitter device to receive said third image signals and one of said first and second image signals and having a delay time $T_p = 1/f_p$, a polarity reverser connected to receive signals from said first delay device, signal combining means connected to the outputs of said signal splitter device and said polarity reverser to produce a combined signal, a second signal splitter connected to receive said combined signal and separate said combined signal into two signal polarity parts, a second delay device and a second polarity reverser respectively connected to receive said two signal parts, the outputs of said second delay device and said second polarity reverser being connected together, and a third polarity reverser connected between said last-named connection and the output of said first delay device, and in which said receiver means includes a first delay device.

6. A multiplex transmission system as claimed in claim 3, in which one of said dot-producing signals is defined by a mathematical expression in which the first two terms are $\pm(-b+2b \cos \omega_p t)$, another of said dot-producing signals is defined by a mathematical expression in which the first three terms are $$\pm(\frac{1}{2}a+a \cos \frac{1}{2}\omega_p t+a \cos \omega_p t)$$

and the remaining of said dot-producing signals is defined by a mathematical expression in which the first three terms are $\pm(\frac{1}{2}c+c \cos (\frac{1}{2}\omega_p t+\pi)+c \cos \omega_p t)$, in which $a$, $b$ and $c$ are constants, $\omega_p$ is equal to $2\pi$ times the limit frequency $f_p$ of said transmission path, and $t$ is the time, a source of a constant signal having an amplitude at least equal to the maximum amplitude of the image signal modulated by said other dot producing signals, means connected to combine said constant signal with the image signal modulated by said remaining dot-producing signals, and in which said receiver means includes a low bandpass filter having a limit frequency of $\frac{1}{2}f_p$ and connected to the output of said signal splitter device.

7. A multiplex transmission system as claimed in claim 3, in which one of said dot-producing signals is defined by a mathematical expression in which the first two terms are $\pm(-b+2b \cos \omega_p t)$, another of said dot-producing signals is defined by a mathematical expression in which the first three terms are $$\pm(\frac{1}{2}a+a \cos (\frac{1}{2}+\omega_p t+n\pi)+a \cos \omega_p t)$$

and the remaining of said dot-producing signals is defined by the mathematical expression $\pm(c+2c \cos \omega_p t)$, means for limiting the bandwidth of the dotted signal produced from said remaining dot-producing signal to a frequency of $\frac{1}{2}f_p$, a fourth source of dot-producing signals which are defined by a mathematical expression in which the first three terms are $$\pm(\frac{1}{2}d+d \cos (\frac{1}{2}\omega_p t+(n+1)\pi)+d \cos \omega_p t)$$

in which $a$, $b$, $c$ and $d$ are constants, $n$ represents a whole number which varies with unity after $k$ frame periods, $k$ being equal to 1 or 2, $\omega_p$ is equal to $2\pi$ times the limit frequency $f_p$ of said transmission path, and $t$ is the time, a source of a constant signal having an amplitude at least equal to the maximum amplitude of the image signal modulated by said other dot-producing signals, means connected to combine said constant signal with the image signal modulated by said remaining dot-producing signals, modulator means connected to modulate the dotted signal produced from said remaining dot-producing signal with the dot-producing signals from said fourth source, and in which said receiver means includes a low bandpass filter having a limit frequency of $\frac{1}{2}f_p$ and connected to the output of said signal splitter device.

8. A multiplex transmission system as claimed in claim 1, in which said transmission path has a bandpass characteristic having radial symmetry with respect to the limit frequency $f_p$, and in which one of said dot-producing signals is defined by the mathematical expression $\pm(a+2a \cos \omega_p t+2a \cos 2\omega_p t)$ and the other of said dot-producing signals is defined by the mathematical expression $$\pm(\tfrac{1}{2}b+b \cos (\tfrac{1}{2}\omega_p t+k\pi)+b \cos \omega_p t$$
$$+b \cos (\tfrac{3}{2}\omega_p t+3k\pi)$$

in which $a$ and $b$ are constants, $\omega_p$ is equal to $2\pi$ times the limit frequency $f_p$ of said transmission path, $t$ is the time, and $k$ is equal to 1 or 2.

9. A multiplex transmission system as claimed in claim 1, including means for combining a portion of at least one of said signals with at least one other of said signals, thereby to reduce any cross-talk.

10. A transmitter for use in a multiplex transmission system, comprising a transmission path having a limited bandwidth, first and second sources of image signals representing line-scanned images, first and second sources of dot-producing signals associated respectively with said image signals, the maximum frequency to be transmitted of at least one of the image signals and the frequency of the associated dot-producing signal being equal to the limit frequency $f_p$ of said transmission path, first and second modulator means connected respectively to said first image and dot-producing signal sources and to said second image and dot-producing signal sources to produce first and second dotted image signals, and means for combining said dotted image signals.

11. A transmitter as claimed in claim 10, in which one of said dot-producing signals is defined by a mathematical expression in which the first two terms are $a+2a \cos \omega_p t$, and in which the other of said dot-producing signals is defined by a mathematical expression in which the first two terms are $-b+2b \cos \omega_p t$, in which $a$ and $b$ are constants, $\omega_p$ is equal to $2\pi$ times the limit frequency $f_p$ of said transmission path, and $t$ is the time.

12. A transmitter as claimed in claim 10, including a third source of dotted image signals, and means for combining signals from said third source with said first and second dotted image signals to produce a modulated signal in which one polarity part of the envelope of said modulated signal represents two of said image signals and the other polarity part of said envelope represents the remaining said image signal.

13. A transmitter as claimed in claim 12, in which one of said dot-producing signals is defined by a mathematical expression in which the first two terms are $\pm(a+2a \cos \omega_p t)$, another of said dot-producing signals is defined by a mathematical expression in which the first two terms are $\pm(-b+2b \cos \omega_p t)$ and the remaining dot-producing signal is defined by a mathematical expression in which the first three terms are $$\pm(\tfrac{1}{2}c+c \cos \tfrac{1}{2}\omega_p t+c \cos \omega_p t)$$

in which $a$, $b$ and $c$ are constants, $\omega_p$ is equal to $2\pi$ times the limit frequency $f_p$ of said transmission path, and $t$ is the time.

14. A transmitter as claimed in claim 12, in which one of said dot-producing signals is defined by a mathematical expression in which the first two terms are $\pm(a+2a \cos \omega_p t)$, another of said dot-producing signals is defined by a mathematical expression in which the first two terms are $\pm(-b+2b \cos \omega_p t)$ and the remaining of said dot-producing signals is defined by the mathematical expression $\pm(c+2c \cos \omega_p t)$, means for limiting the bandwidth of the dotted signal produced from said remaining dot-producing signal to a frequency of $\tfrac{1}{2}f_p$, a fourth source of dot-producing signals which are defined by a mathematical expression in which the first three terms are $\pm(\tfrac{1}{2}d+d \cos (\tfrac{1}{2}\omega_p t+n\pi)+d \cos \omega_p t)$, in which $a$, $b$, $c$ and $d$ are constants, $n$ represents a whole number which varies with unity after $k$ frame periods, $k$ being equal to 1 or 2, $\omega_p$ is equal to $2\pi$ times the limit frequency $f_p$ of said transmission path, and $t$ is the time, and modulator means connected to modulate the dotted signal produced from said remaining dot-producing signal with the dot-producing signals from said fourth source.

15. A transmitter as claimed in claim 12, in which one of said dot-producing signals is defined by a mathematical expression in which the first two terms are $\pm(-b+2b \cos \omega_p t)$, another of said dot-producing signals is defined by a mathematical expression in which the first three terms are $\pm(\tfrac{1}{2}a+a \cos \tfrac{1}{2}\omega_p t+a \cos \omega_p t)$ and the remaining of said dot-producing signals is defined by a mathematical expression in which the first three terms are $\pm(1c+c \cos (\tfrac{1}{2}\omega_p t+\pi)+c \cos \omega_p t)$, in which $a$, $b$ and $c$ are constants, $\omega_p$ is equal to $2\pi$ times the limit frequency $f_p$ of said transmission path, and $t$ is the time, a source of a constant signal having an amplitude at least equal to the maximum amplitude of the image signal modulated by said other dot-producing signals, and means connected to combine said constant signal with the image signal modulated by said remaining dot-producing signals.

16. A transmitter as claimed in claim 12, in which one of said dot-producing signals is defined by a mathematical expression in which the first two terms are $\pm(-b+2b \cos \omega_p t)$, another of said dot-producing signals is defined by a mathematical expression in which the first three terms are $$\pm(\tfrac{1}{2}a+a \cos (\tfrac{1}{2}\omega_p t+n\pi)+a \cos \omega_p t)$$

and the remaining of said dot-producing signals is defined by the mathematical expression $\pm(c+2c \cos \omega_p t)$, means for limiting the bandwidth of the dotted signal produced from said remaining dot-producing signal to a frequency of $\tfrac{1}{2}f_p$, a fourth source of dot-producing signals which are defined by a mathematical expression in which the first three terms are $$\pm(\tfrac{1}{2}d+d \cos (\tfrac{1}{2}\omega_p t+(n+1)\pi)+d \cos \omega_p t)$$

in which $a$, $b$, $c$ and $d$ are constants, $n$ represents a whole number which varies with unity after $k$ frame periods, $k$ being equal to 1 or 2, $\omega_p$ is equal to $2\pi$ times the limit frequency $f_p$ of said transmission path, and $t$ is the time, a source of a constant signal having an amplitude at least equal to the maximum amplitude of the image signal modulated by said other dot-producing signals, and means connected to combine said constant signal with the image signal modulated by said remaining dot-producing signals.

17. A transmitter as claimed in claim 10, in which one of said dot-producing signals is defined by the mathematical expression $\pm(a+2a \cos \omega_p t+2a \cos 2\omega_p t)$ and the other of said dot-producing signals is defined by the mathematical expression $$\pm(\tfrac{1}{2}b+b \cos (\tfrac{1}{2}\omega_p t+k\pi)+b \cos \omega_p t$$
$$+b \cos (\tfrac{3}{2}\omega_p t+3k\pi)$$

in which $a$ and $b$ are constants, $\omega_p$ is equal to $2\pi$ times the limit frequency $f_p$ of said transmission path, $t$ is the time, and $k$ is equal to 1 or 2.

18. A transmitter as claimed in claim 10, including means for combining a portion of at least one of said signals with at least one other of said signals, thereby to reduce any cross-talk.

19. A television receiver for the reception of a modulated signal of which the positive-polarity part represents one television image signal and the negative-polarity part represents another television image signal, comprising a signal splitter device connected to receive said modulated signal and having means for establishing a fixed reference level, means for separating from the received signal a positive-polarity part thereof which exceeds said reference level in the positive-polarity direction and which represents said one television image signal, and means for separating from the received signal a negative-polarity part thereof which exceeds said reference level in the negative-polarity direction and which represents said other television image signal.

20. A television receiver for the reception of a modulated signal of which the positive-polarity part represents one television image signal and the negative-polarity part represents another television image signal, comprising a first image reproducing tube having a control electrode, means connected to bias said control electrode at a fixed reference level so that said control electrode will be responsive to only the positive-polarity part of said modulated signal, a second image reproducing tube having a control electrode, means connected to bias the last-named control electrode at a fixed reference level so that said last-named control electrode will be responsive to only the negative-polarity part of said modulated signal, and means connected to feed said modulated signal simultaneously to both of said control electrodes.

21. A receiver for the reception of a modulated signal of which one polarity part represents a first image signal and the other polarity part represents second and third image signals, comprising a first signal splitting device connected to receive said signal, a first delay device connected to said signal splitting device to receive one of said image signals, a first image reproducing tube connected to said delay device to receive the delayed said image signal, a second signal delay device connected to said signal splitter device to receive the remaining image signals, a polarity reverser connected to receive signals from said second delay device, signal combining means connected to the outputs of said signal splitter device and said polarity reverser to produce a combined signal, a second signal splitter connected to receive said combined signal and separate said combined signal into two signal polarity parts, a third delay device and a second polarity reverser respectively connected to receive said two signal parts, a second image reproducing tube, the outputs of said third delay device and said second polarity reverser being connected together and to said second image reproducing tube, a third polarity reverser connected between said last-named connections and the output of said second delay device, and a third image reproducing device connected to the output of said second delay device.

22. The receiver as claimed in claim 21, in which said delay devices have the delay time $T_p = 1/f_p$, in which $f_p$ is the limit frequency of said modulated signal.

23. A receiver for the reception of a modulated signal of which one polarity part represents one image signal and the other polarity part represents two other image signals, comprising a first signal splitter connected to receive said modulated signal and split said last-named signal into said polarity parts, a first image reproduction tube connected to said signal splitter to receive said one polarity part, a second signal splitter connected to said first signal splitter to receive said two other image signals and split off one of said last-named signals, a second image reproduction tube connected to said second signal splitter to receive said last-named signal, a bandpass filter connected to said second signal splitter to receive the remaining portion of said two other image signals, and a third image reproduction device connected to the output of said filter.

24. A receiver as claimed in claim 23, in which said bandpass filter has a limit frequency of $\tfrac{1}{2}f_p$, in which $f_p$ is the limit frequency of said modulated signal.

25. A receiver as claimed in claim 24, in which the bandpass characteristic of said filter has radial symmetry with respect to said limit frequency.

References Cited in the file of this patent

UNITED STATES PATENTS

| | | |
|---|---|---|
| 1,906,269 | Hough | May 2, 1933 |
| 2,212,808 | Cooley | Aug. 27, 1940 |
| 2,256,317 | Earp | Sept. 16, 1941 |
| 2,352,634 | Hull | July 4, 1944 |
| 2,558,489 | Kalfaian | June 26, 1951 |
| 2,607,035 | Levine | Aug. 12, 1952 |
| 2,611,826 | Kalfaian | Sept. 23, 1952 |
| 2,615,986 | Kalfaian | Oct. 28, 1952 |
| 2,677,720 | Bedford | May 4, 1954 |